US007546999B2

(12) United States Patent
Ro et al.

(10) Patent No.: US 7,546,999 B2
(45) Date of Patent: Jun. 16, 2009

(54) SOLENOID VALVE FOR CONTROLLING WATER SUPPLY

(75) Inventors: Gwan Ho Ro, Seoul (KR); Young Sik Nam, Gyeonggi-Do (KR)

(73) Assignee: Useong Electro Mechanics Co., Ltd., Gyeonggi-Do (KR)

( * ) Notice: Subject to any disclaimer, the term of this patent is extended or adjusted under 35 U.S.C. 154(b) by 182 days.

(21) Appl. No.: 11/543,072

(22) Filed: Oct. 5, 2006

(65) Prior Publication Data

US 2007/0170111 A1 Jul. 26, 2007

(30) Foreign Application Priority Data

Jan. 20, 2006 (KR) ..................... 10-2006-0006374

(51) Int. Cl.
*F16K 47/00* (2006.01)
*F16L 55/027* (2006.01)

(52) U.S. Cl. .......................... 251/120; 251/127; 138/42

(58) Field of Classification Search ................. 251/118, 251/120, 127; 138/42, 45, 44, 46, 41; 137/504, 137/8, 512, 512.4; 239/570
See application file for complete search history.

(56) References Cited

U.S. PATENT DOCUMENTS 2,829,674 A * 4/1958 Segelhorst et al. ............ 138/45
3,697,002 A * 10/1972 Parkison ................ 239/533.14
5,027,861 A * 7/1991 Gute ........................... 138/45
5,209,265 A * 5/1993 Taguri et al. .................. 138/45
5,487,528 A * 1/1996 Richmond .................. 251/127
5,582,210 A * 12/1996 Bartholomew ............... 138/45
5,622,204 A * 4/1997 Skoglund .................... 137/501
5,813,652 A * 9/1998 Richmond et al. .......... 251/127
6,378,542 B1 * 4/2002 DuHack ........................ 137/8
7,225,829 B2 * 6/2007 Bailey ..................... 137/454.6

* cited by examiner

*Primary Examiner*—Tony G Soohoo
*Assistant Examiner*—Paul J Durand
(74) *Attorney, Agent, or Firm*—Dykema Gossett PLLC

(57) ABSTRACT

Disclosed is a solenoid valve for controlling water supply. The solenoid valve includes a constant flow control member having a chamber at one side of a connecting pipe branched from a body which has an outlet port, the chamber temporarily accommodating water and quantitatively supplying the water by using a flow control sheet, and a low-pressure flow control member tightly installed in an inlet port which communicates with the connecting pipe of the chamber, the low-pressure flow control member having a hollow body to enclose the flow control sheet. A first flow channel is formed between an outer periphery of the low-pressure flow control member and an inner periphery of the inlet port, and a second flow channel is formed by a hole of the low-pressure flow control member, a passage of the flow control sheet, and a hole of the resilient member.

3 Claims, 6 Drawing Sheets

29 40 33 26 30 31 32 34 34

40
33
44
26
30
44
29
42
34
31
34
44
32

SOLENOID VALVE FOR CONTROLLING WATER SUPPLY

BACKGROUND OF THE INVENTION

1. Field of the Invention

The present invention relates to a solenoid valve for controlling water supply, and more particularly, to a solenoid valve for controlling water supply, by which a flow of water is constantly maintained irrespective of the flow pressure of the water.

2. Background of the Related Art

Several solenoid valves installed at a proper position on a water supply pipe directly connected to a water service pipe to control the supply of the water have been developed and used. Such a solenoid valve is additionally installed in any apparatus requiring to control the supply of the water, such as refrigerator, water purifier, or coffee vending machine.

In case of the solenoid valve for controlling the supply of the water in a refrigerator, for example, it selectively supplies the water to a dispenser or an ice maker from the water service pipe through a flow control member, as shown in FIG. 1.

More specifically, the solenoid valve includes a pair of bodies 10 and a constant flow control member 20 to supply the water to the dispenser and the ice maker. Each of the bodies 10 has a valve chest 14 with a valve seat 13 which is opened or closed by a movable iron core 12 driven by an electromagnet 11. The valve chest 14 is provided on the lower portion thereof with an outlet port 15 receiving a hose connected to the dispenser and the ice maker.

The constant flow control member 20 includes a water input port 25 having one side coupled to a connecting pipe 21 which is branched from each of the bodies 10, and the other side receiving a nipple 23 which is coupled to a duct 22 by a fastening nut 24 directly connected to the water service pipe, so that the water is supplied to the water input port 25. A chamber 27 having a desired width is formed between the water input port 25 and the connecting pipe 21. The chamber temporarily accommodates the water supplied from the water input port 25 so as to drop down a water head of the water and quantitatively discharge the water by using a flow control sheet 26.

The solenoid valve for controlling the water to be supplied to the dispenser of the refrigerator is operated on the basis of a constant flow control. In particular, the solenoid valve is necessarily required for the ice maker, since the water for making ice is constantly supplied irrespective of the variation of water head in the water service pipe.

According to the conventional solenoid valve for controlling the water supply, a channel communicating with the connecting pipe 21 is formed in the flow control sheet 26 which is installed on a wall of the chamber 27 adjacent to the connecting pipe 21. However, the channel connected to the connecting pipe 21 forms a unique passage, so that the water cannot be constantly maintained in accordance with the increase/decrease of the pressure.

SUMMARY OF THE INVENTION

Accordingly, the present invention is directed to a solenoid valve that substantially obviates one or more problems due to limitations and disadvantages of the related art.

An object of the present invention is to provide a solenoid valve for controlling water supply by varying a flow channel of water in accordance with flow pressure of the water, so that the flow of the water can be constantly maintained irrespective of the flow pressure of the water.

To achieve the object and other advantages, according to one aspect of the present invention, there is provided a solenoid valve for controlling water supply, comprising: a constant flow control member having a chamber at one side of a connecting pipe branched from a body which has an outlet port, the chamber temporarily accommodating water and quantitatively supplying the water by using a flow control sheet; and a low-pressure flow control member tightly installed in an inlet port which communicates with the connecting pipe of the chamber, the low-pressure flow control member having a hollow body to enclose the flow control sheet, in which a first flow channel is formed between an outer periphery of the low-pressure flow control member and an inner periphery of the inlet port, and a second flow channel is formed by a hole of the low-pressure flow control member, a passage of the flow control sheet, and a hole of the resilient member.

The low-pressure flow control member has a boss of a resin for preventing close contact between a contact surface of the resilient member and the low-pressure flow control member. The resilient member is made of rubber.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

A preferred embodiment according to the present invention will now be explained with reference to the accompanying drawings.

Figure 1:
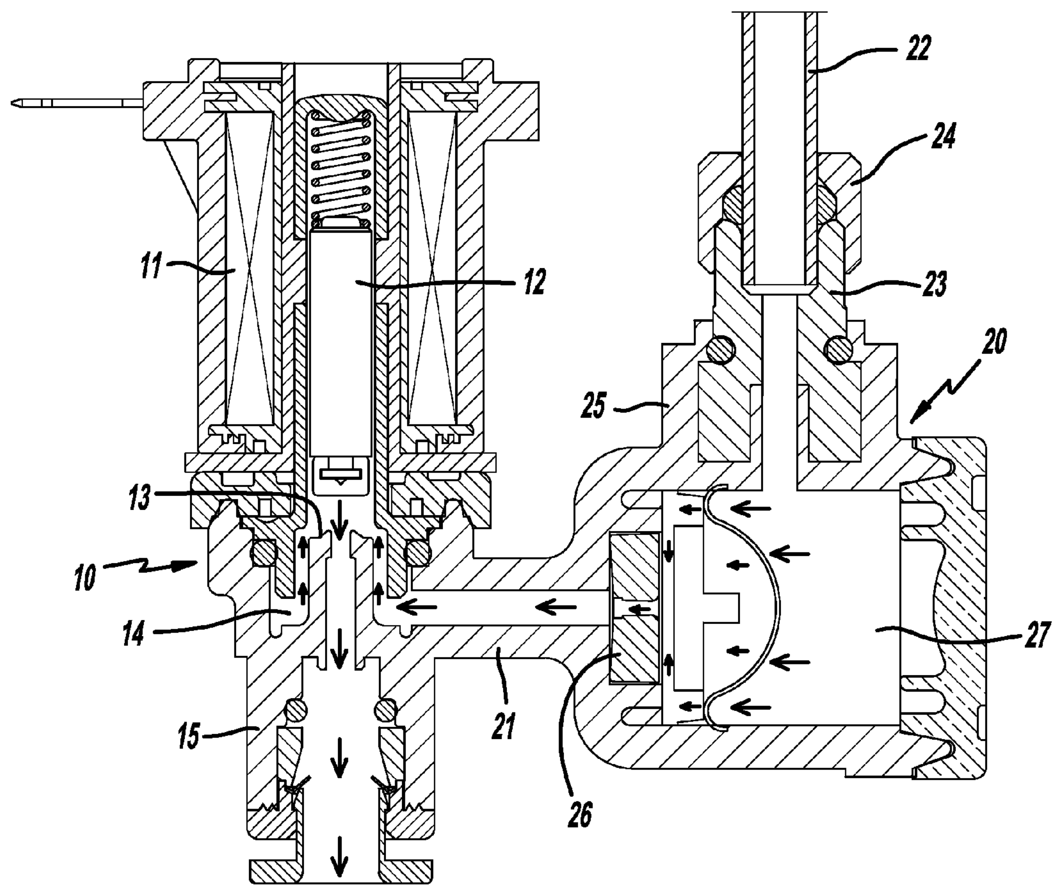
FIG. 1 is a cross-sectional view illustrating the construction of a conventional solenoid valve.
Figure 2:
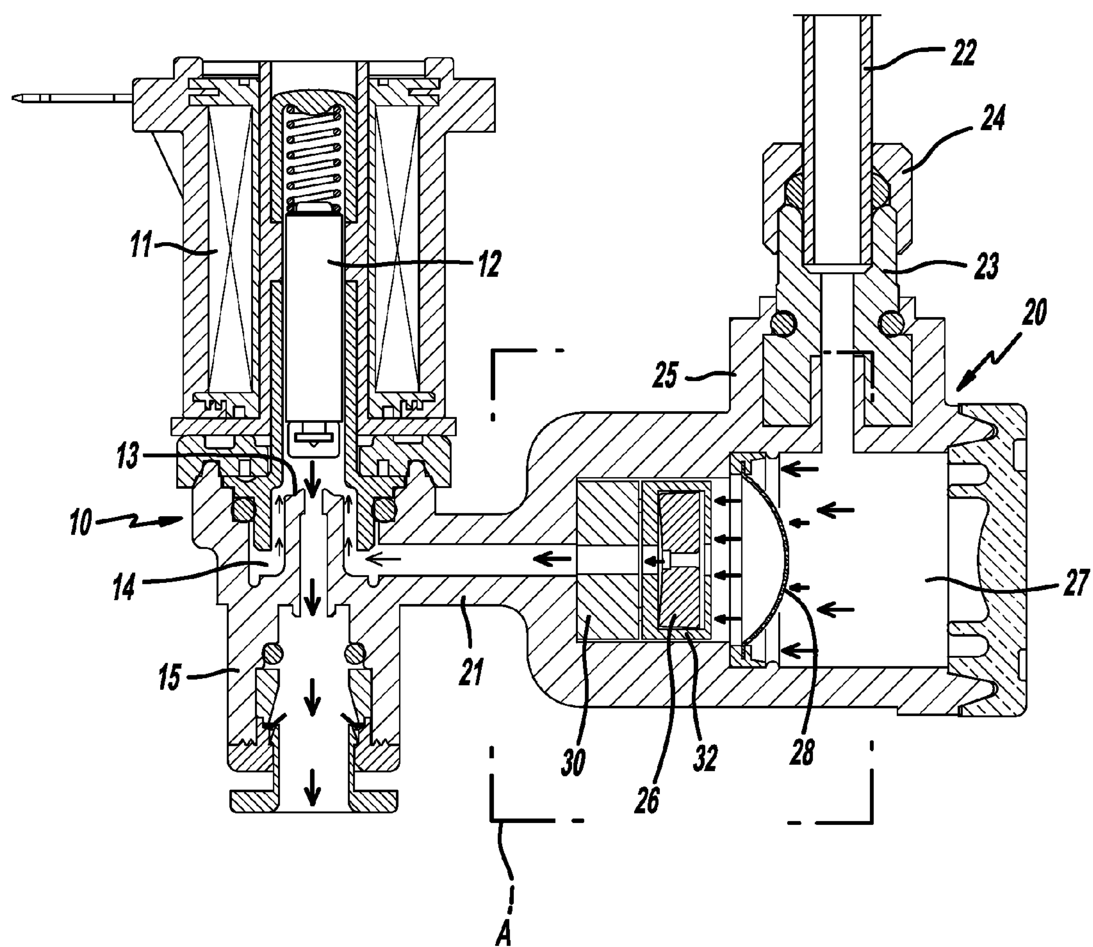
FIG. 2 is a cross-sectional view illustrating the construction of a solenoid valve according to the present invention.
Figure 3:
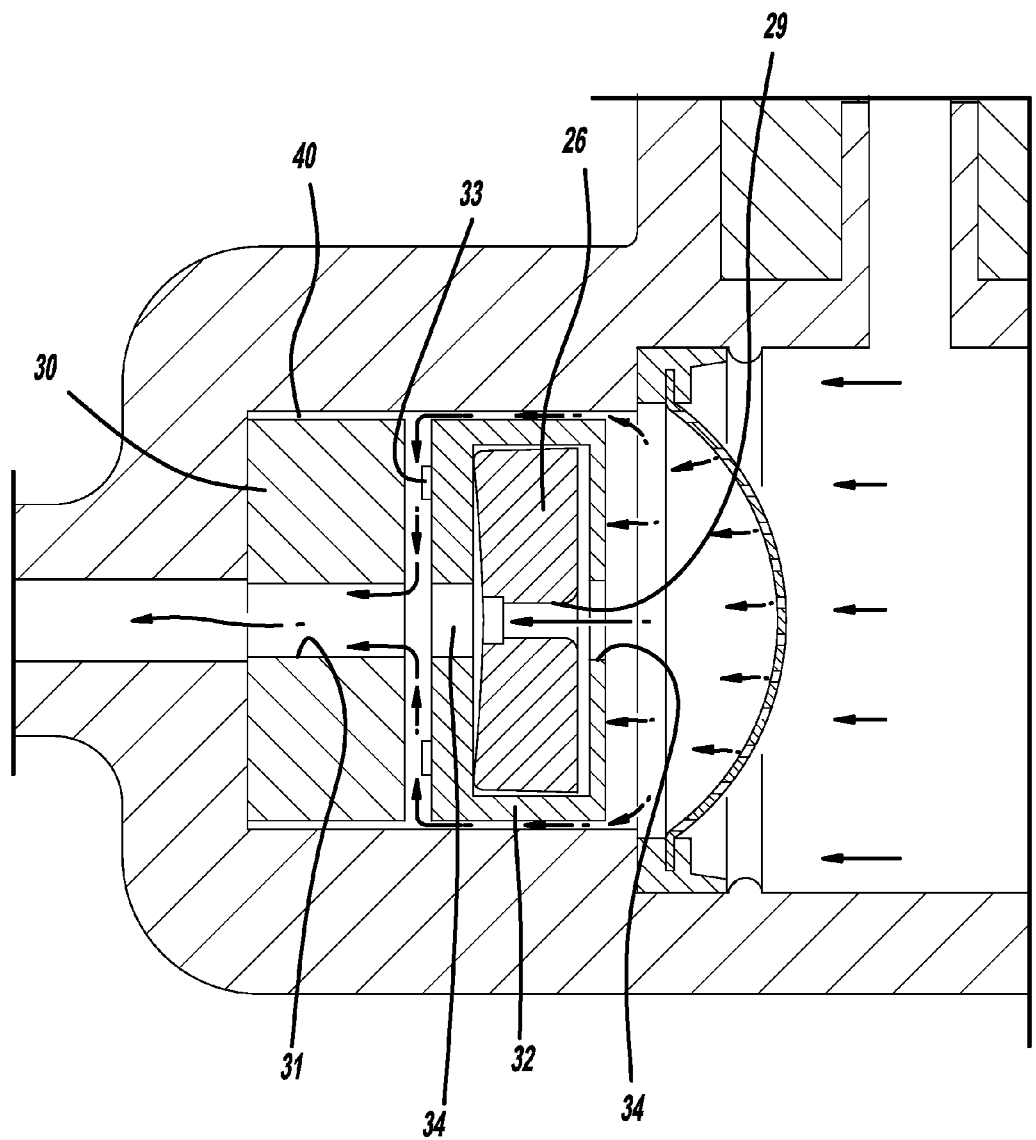
FIG. 3 is an enlarged cross-sectional view of the portion A in FIG. 2 to illustrate a flow channel of water at low pressure.
Figure 4:
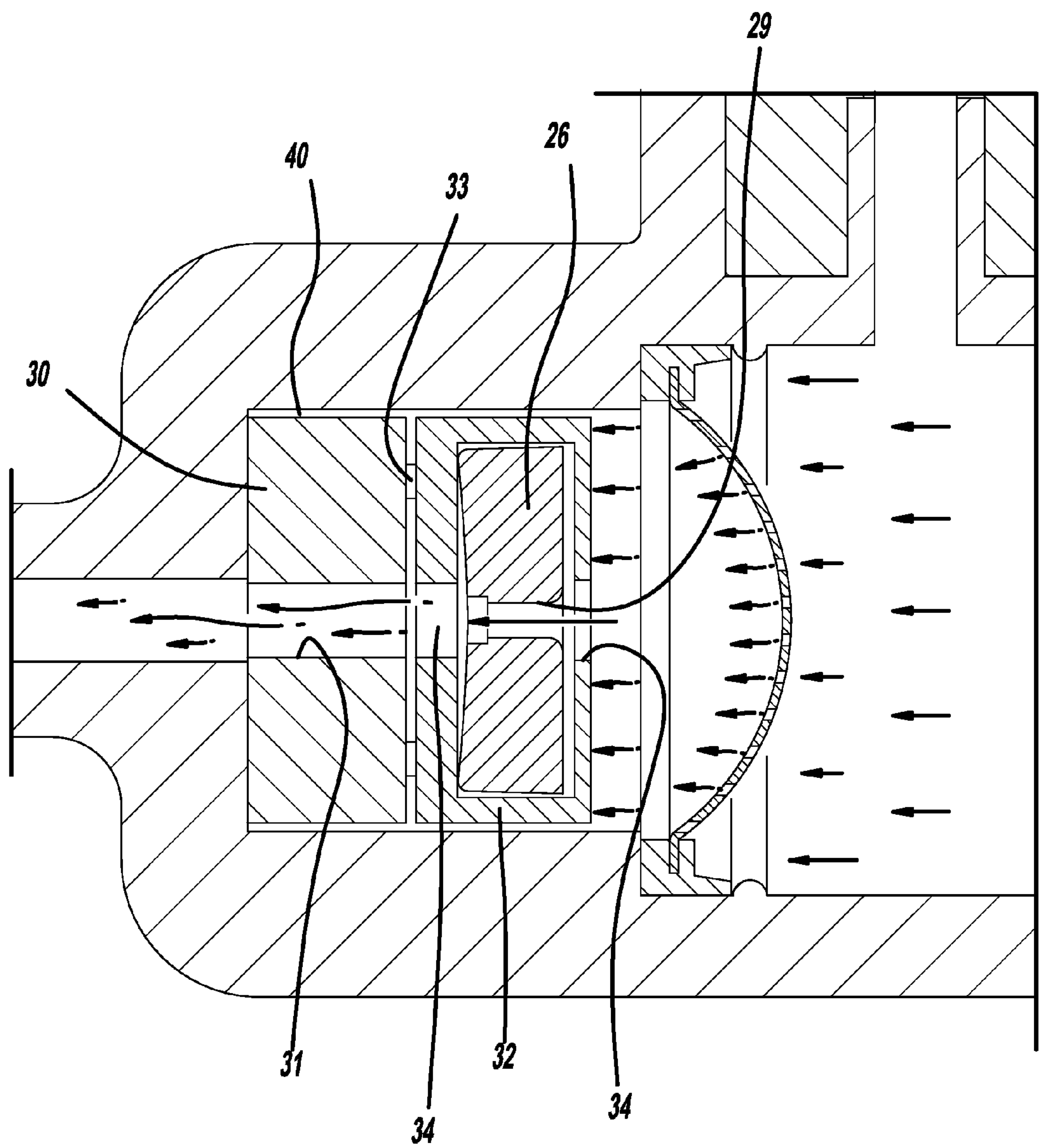
FIG. 4 is an enlarged cross-sectional view of the portion A in FIG. 2 to illustrate a flow channel of water at high pressure.

FIG. 2 is a cross-sectional view illustrating the construction of a solenoid valve according to the present invention, and FIGS. 3 and 4 are enlarged cross-sectional views of the portion A in FIG. 2 to illustrate an operation state as a function of a pressure difference.

In case of the solenoid valve for controlling the water supply in a refrigerator, for example, it selectively and quantitatively supplies the water to a dispenser or an ice maker from the water service pipe through a flow control member.

The solenoid valve of the present invention includes at least one body 10 and a constant flow control member 20 to interrupt the supply of the water to the dispenser and the ice maker. The body 10 has a valve chest 14 with a valve seat 13 which is opened or closed by a movable iron core 12 driven by an electromagnet 11. The valve chest 14 is provided on the lower portion thereof with an outlet port 15 receiving a hose connected to the dispenser and the ice maker.

The constant flow control member 20 includes a water input port 25. One side of the water input port 25 is coupled to a connecting pipe 21 which is branched from each of the bodies 10, and the other side receives a nipple 23 which is coupled to a duct 22 by a fastening nut 24 directly connected to the water service pipe, so that the water is supplied to the water input port 25.

A chamber 27 having a desired width is formed between the water input port 25 and the connecting pipe 21. The chamber temporarily accommodates the water supplied from the water input port 25 so as to drop down a water head of the water and quantitatively discharge the water by using a flow control sheet 26. Reference numeral 28 denotes a filter.

The construction of the solenoid valve is similar to that of a conventional solenoid valve. The present invention is characterized in that the water supplied through the chamber 27 of the constant flow control member 20 is quantitatively supplied to the body 10 irrespective of the variation of water head in the water service pipe.

More specifically, an inlet port 40 is formed in the chamber 27 of the constant flow control member 20, and communicates with the connecting pipe 21. A resilient member 30 and a low-pressure flow control member 32 are tightly installed in the inlet port 40. The low-pressure flow control member 32 has a hollow body to enclose the flow control sheet 26.

The low-pressure flow control member 32 has a boss 33 of a resin for preventing the close contact between a contact surface of the resilient member 30 and the low-pressure flow control member 32, and an outer periphery of the low-pressure flow control member 32 is positioned adjacent to the inner sidewall of the inlet port 40. Further, the resilient member 30 is made of rubber to improve the adherence between the resilient member 30 and the inlet port 40 and prevent the close contact between the low-pressure flow control member 32 and the resilient member 30.

Holes 31 and 34 are formed on the resilient member 30 and the low-pressure flow control member 32, respectively, so that a passage 29 of the flow control sheet 26 communicates with the connecting pipe 21. The boss 33 protrudes from the low-pressure flow control member 32 around the hole 34, and the passage 29 is coaxially aligned with the holes 31 and 34.

The solenoid valve for controlling the water supply according to the present invention includes two channels formed by a pressure difference of the water, that is, a first flow channel 44 and a second flow channel 42, as a passage of the water supplied from the chamber 27 to the body 10 through the connecting pipe 21.

First flow channel 44 is formed between the outer periphery of the low-pressure flow control member 32 and the inner periphery of the inlet port 40, and the resilient member 30 and the low-pressure flow control member 32, as shown in FIG. 3, and communicates with the hole 31 of the resilient member 30. Second flow channel 42 is formed by the hole 34 of the low-pressure flow control member 32, the passage 29 of the flow control sheet 26, and the hole 31 of the resilient member 30, as shown in FIGS. 3 and 4.

The first and second flow channels are to supply the quantitative water fed in the chamber 27 into the body 10 in accordance with the pressure difference. FIG. 3 shows the flow channel of the water at low pressure, and FIG. 4 shows the flow channel of the water at high pressure.

Figure 5:
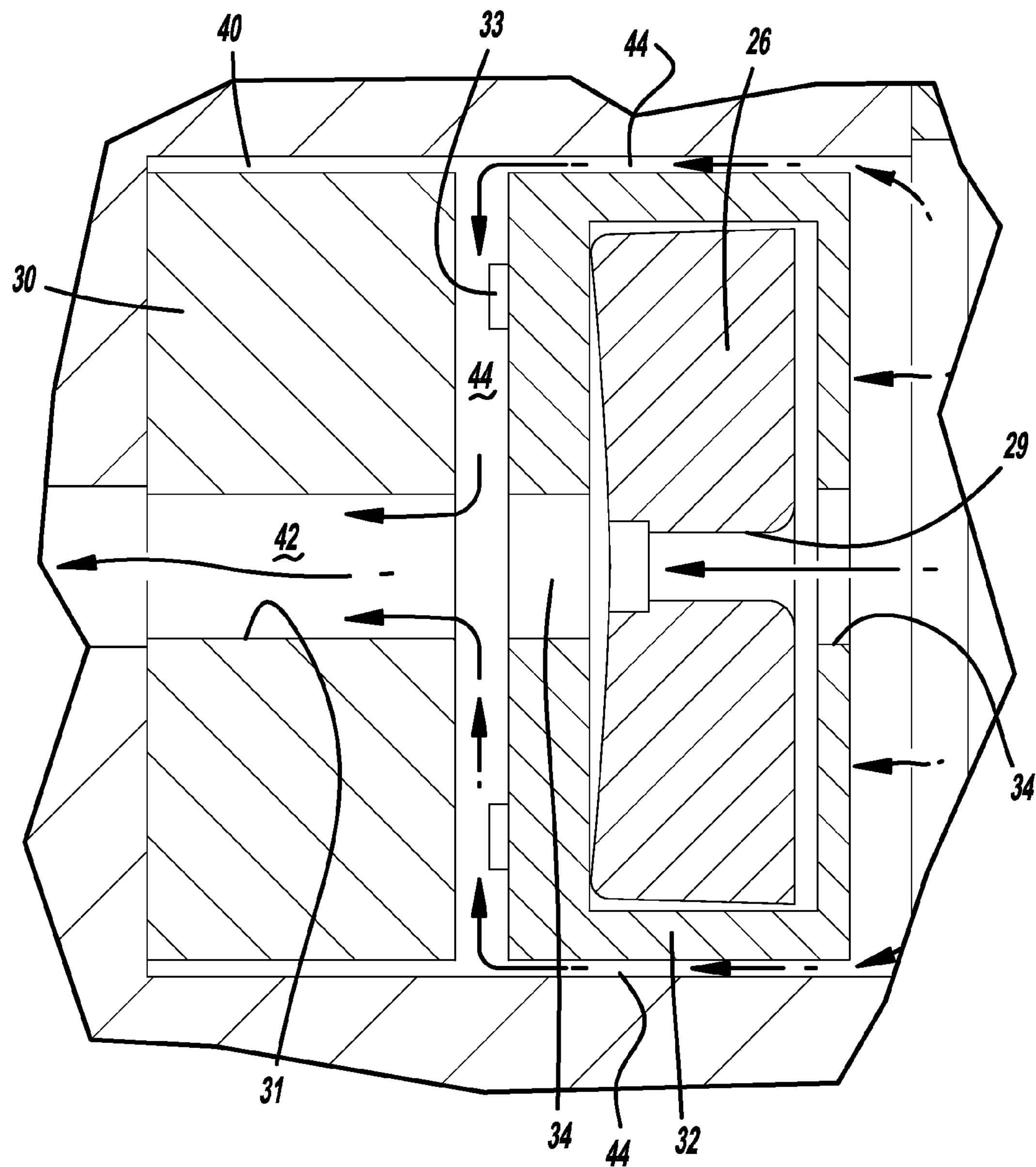
FIG. 5 is an enlarged cross-sectional view of the inlet port according to the present invention to illustrate a flow channel of water at low pressure.

More specifically, if the pressure of the water fed in the body 10 from the chamber 27 is low, as shown in FIG. 3 and FIG. 5, the water flows through first flow channel 44 and second flow channel 42, so that the flow of the water is not decreased in proportion to the pressure. Consequently, a proper amount of the water is supplied into the body 10 through the connecting pipe 21.

Figure 6:
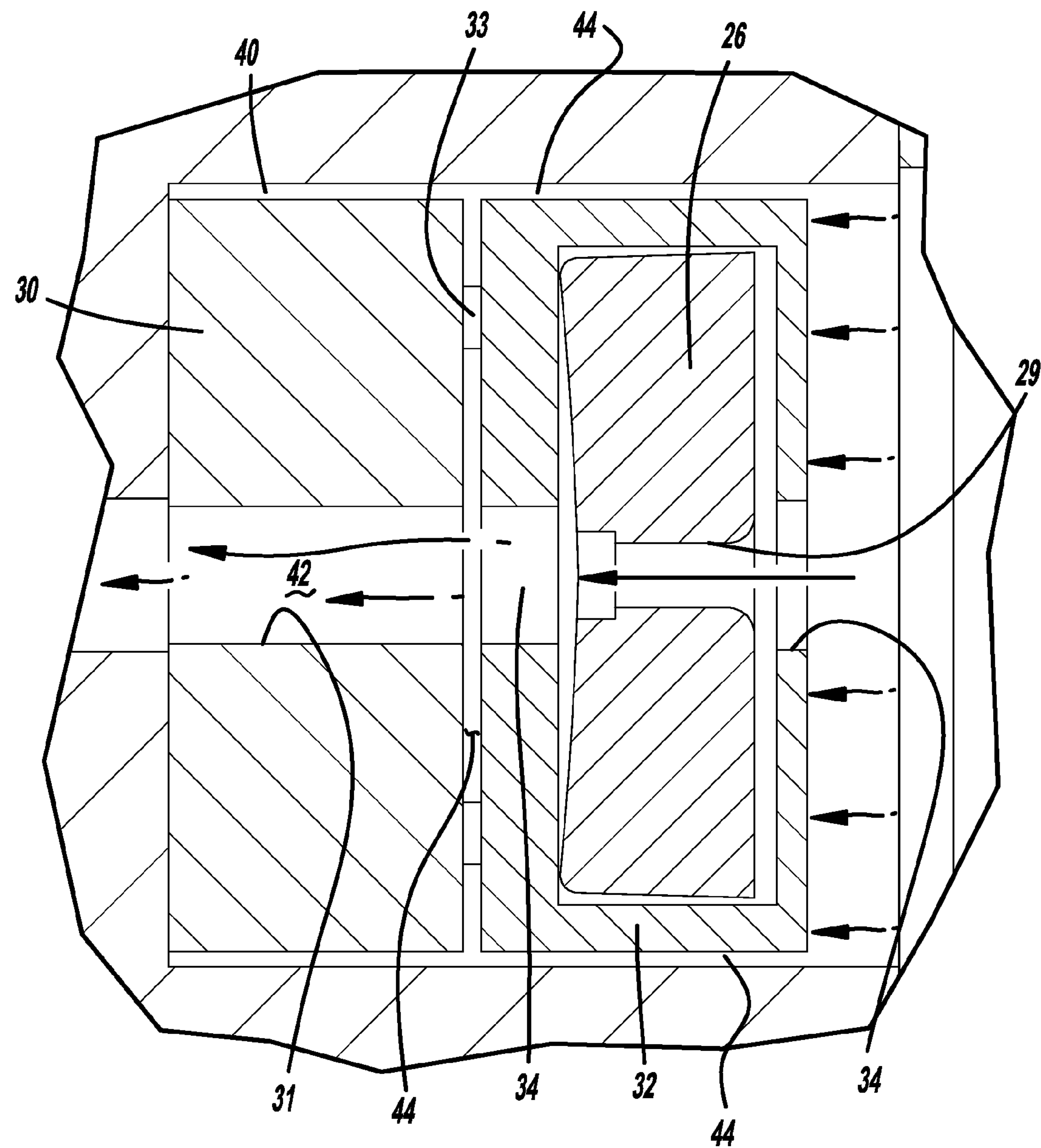
FIG. 6 is an enlarged cross-sectional view of the inlet port according to the present invention to illustrate a flow channel of water at high pressure.

In addition, if the pressure of the water fed in the body 10 from the chamber 27 is middle or high, as shown in FIG. 4 and FIG. 6, first flow channel 44 is blocked, and a proper amount of the water is supplied into the body through only second flow channel 42.

According to the construction in that first flow channel 44 is opened or closed by the pressure of the water, the water fed in the chamber 27 is filtered by the filter 28 and pushes the low-pressure flow control member 32. In this instance, first flow channel 44 is closed at middle or high pressure in which the boss 33 of the low-pressure flow control member 32 closely contacts the resilient member 30. However, first flow channel 44 is opened at low pressure in which the boss does not contact the resilient member 30.

The high, middle, or high pressure of the water is judged by the adherence between the boss 33 and the resilient member 30 when the low-pressure flow control member 32 installed in the passage of the water is pushed by the water fed in the chamber 27 flowing through the connecting pipe 21.

As described above, since the solenoid valve is provided with two flow channels through which the water is fed in the body through the connecting pipe, either of the flow channels is opened or closed by the pressure of the water, thereby supplying a proper amount of the water irrespective of the pressure difference of the water.

The forgoing embodiment is merely exemplary and is not to be construed as limiting the present invention. The present teachings can be readily applied to other types of apparatus. The description of the present invention is intended to be illustrative, and not to limit the scope of the claims. Many alternatives, modifications, and variations will be apparent to those skilled in the art.

What is claimed is:

1. A solenoid valve for controlling water supply, comprising:

a constant flow control member having a chamber at one side of a connecting pipe branched from a body which has an outlet port, the chamber temporarily accommodating water and quantitatively supplying the water by using a flow control sheet; and a low-pressure flow control member installed in an inlet port, such that an outer periphery of the low-pressure flow control member is positioned adjacent to an inner sidewall of the inlet port, the low-pressure control member communicating with the connecting pipe of the chamber, the low-pressure flow control member having a hollow body to enclose the flow control sheet, wherein a first flow channel is formed between the outer periphery of the low-pressure flow control member and the inner periphery of the inlet port, and a second flow channel is formed by a hole through the low-pressure flow control member and a hole through a resilient member, the hole through the low-pressure flow control member being coaxially aligned with and in communication with a passage through the flow control sheet, wherein the hole through the low-pressure flow control member and the hole through the resilient member are coaxially aligned with each other and in communication with each other and in communication with the passage.

2. The solenoid valve of claim 1, wherein the low-pressure flow control member has a boss of a resin for preventing close contact between a contact surface of the resilient member and the low-pressure flow control member.

3. The solenoid valve of claim 1, wherein the resilient member is made of rubber.

* * * * *